United States Patent [19]
Weidman

[11] Patent Number: 5,295,211
[45] Date of Patent: Mar. 15, 1994

[54] FIBER AMPLIFIER COUPLER

[75] Inventor: David L. Weidman, Corning, N.Y.

[73] Assignee: Corning Incorporated, Corning, N.Y.

[21] Appl. No.: 1,337

[22] Filed: Jan. 7, 1993

[51] Int. Cl.$^5$ .............................................. G02B 6/26
[52] U.S. Cl. ........................................ 385/43; 372/6;
385/144; 385/24
[58] Field of Search ..................... 385/15, 24, 42, 43,
385/48, 122, 141–145; 372/6

[56] References Cited

U.S. PATENT DOCUMENTS

| | | | |
|---|---|---|---|
| 3,372,969 | 3/1968 | Snitzer | 372/6 |
| 4,673,270 | 6/1987 | Gordon | 350/96.15 |
| 4,798,436 | 1/1989 | Mortimer | 350/96.15 |
| 4,904,040 | 2/1990 | Takesue et al. | 350/96.15 |
| 4,976,512 | 12/1990 | Safaai-Jazi | 350/96.33 |
| 5,004,716 | 9/1991 | Berkey | 385/43 |
| 5,011,251 | 4/1991 | Miller et al. | 350/96.15 |
| 5,054,874 | 10/1991 | Hill et al. | 385/28 |
| 5,129,020 | 7/1992 | Shigematsu et al. | 385/43 |
| 5,179,603 | 1/1993 | Hall et al. | 385/24 |
| 5,195,149 | 3/1993 | Pfeiffer et al. | 372/6 |

Primary Examiner—Rodney B. Bovernick
Assistant Examiner—John Ngo
Attorney, Agent, or Firm—W. J. Simmons, Jr.

[57] ABSTRACT

Disclosed is a fiber amplifier system in which a gain fiber is operatively combined with a fiber optic coupler having first and second coupler optical fibers. The coupler fibers are fused together along a portion of their lengths to form a wavelength dependent coupling region whereby most of the light power of a wavelength $\lambda_S$ couples between them, and most of the light power of a wavelength $\lambda_P$ that is introduced into the first fiber remains in it. The mode field diameter of the first coupler fiber is substantially matched to that of the gain fiber and is smaller than that of the second coupler fiber. One end of the first coupler fiber is spliced to the gain fiber. The difference in mode field diameters between said couplers is sufficient create a difference in coupler fiber propagation constants in the coupling region which degrades the coupling of the $\lambda_S$ signal. To overcome the difference in coupler fiber propagation constants in the coupling region, and thereby increase the coupled signal power to an acceptable level, a fiber characteristic, whose affect on MFD is insignificant, is modified in one of the coupler fibers.

20 Claims, 3 Drawing Sheets

FIBER AMPLIFIER COUPLER

BACKGROUND OF THE INVENTION

The present invention relates to optical fiber couplers and, more particularly, to couplers that are adapted for use in optical fiber amplifiers.

In many couplers, it is desired to obtain substantially 100% coupling at a particular wavelength or band of wavelengths. It is also sometimes desirable to use two fibers in a 1×2 or 2×2 coupler which differ substantially in core index, core diameter, and/or cutoff. For example, published European patent application EP-A-0504479 teaches a fiber amplifier including a gain fiber 10 (see FIG. 1 hereof). A wavelength division multiplexer (WDM) fiber optic coupler 20 couples pump power of wavelength $\lambda_P$ from laser diode 15 and the signal of wavelength $\lambda_S$ from input telecommunication fiber 14 to gain fiber 10. The fiber pigtails extending from coupler 20 are connected to other optical fibers by fusion splices or butt joint connectors, splices 16, 22 being preferred because of their lower reflection and insertion loss. For optimal amplifier operation, the input signal splice loss at splice 16 should be small in order to maximize signal-to-noise (S/N) of the amplifier because in the signal-spontaneous beat noise limit, the electrical S/N of the amplifier depends linearly on the optical coupling efficiency. Also, the loss at splice 22 should be low for both good coupling efficiency (for the same S/N reason stated above) and pump coupling efficiency since amplifier gain is related to the amount of pump power coupled to the gain fiber. A coupling means 24 such as a tapering fiber or a coupler similar to coupler 20 can provide a relatively low loss connection between the gain fiber and an outgoing telecommunication fiber 25.

Gain fibers operate best when the intensities of both the pump and signal beams are high. This can be accomplished by providing the gain fiber with a relatively small mode field diameter (MFD), a characteristic that causes the optical power to be concentrated in a relatively small area along the fiber axis. Such a "high gain" or "high efficiency" fiber can be achieved by employing a relatively large value of $\Delta_{1-2}$ and a relatively small core diameter. The term $\Delta_{1-2}$ is equal to $(n_1^2-n_x^2)/2n_1^2$, where $n_1$ and $n_2$ are the refractive indices of the fiber core and cladding, respectively. It is also desirable that the cutoff wavelength of the small mode field diameter fiber be below wavelength $\lambda_P$ of the pump source in order to achieve optimal pump signal energy coupling and low noise.

If a conventional WDM coupler were used for coupler 20 and both coupler fibers were commercially available telecommunication fibers, the mode field mismatch between the small MFD high gain fiber and the large MFD fiber would cause high insertion losses at the splice between those fibers. Consider, for example, a telecommunication system employing an erbium doped gain fiber having MFDs of 6.4 μm and 3.7 μm at 1550 nm and 1000 nm, respectively. The gain fiber is capable of amplifying signals at wavelengths between 1530 and 1560 nm; of the various possible pump wavelengths, 980 nm is preferred. If coupler 20 were a conventional WDM coupler, it would typically be formed of matched commercially available telecommunication fibers having MFDs of 10.5 μm and 5.7 μm at 1550 nm and 1000 nm, respectively, for example. Such coupler fibers are chosen to minimize the splice loss to telecommunication fibers. However, a splice between the aforementioned gain and telecommunication fibers would exhibit splice losses of 0.5 dB and 1.7 dB at 1536 nm and 980 nm, respectively. Such splice losses reduce amplifier gain, and they reduce the useable output power of the amplifier.

Figure 1:
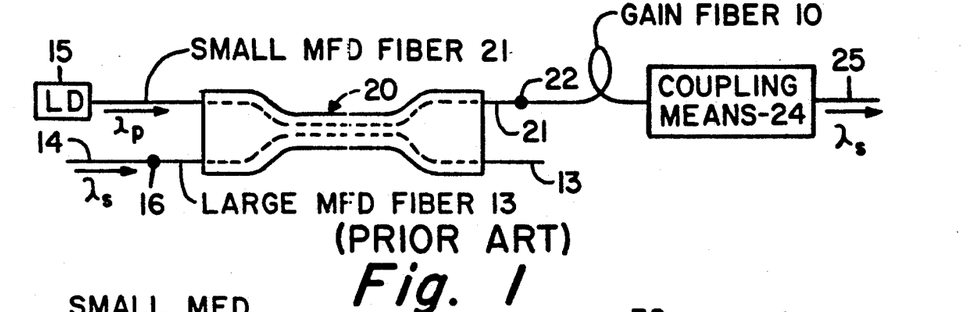
FIG. 1 is a schematic illustration of a prior art optical fiber amplifier.

In accordance with the teachings of EP-A-0504479, the fiber amplifier of FIG. 1 employs a WDM coupler 20 which is formed of two different optical fibers 21 and 13. Fiber 13 is an optical fiber, the MFD of which substantially matches that of telecommunication fiber 14, and fiber 21 is an optical fiber, the MFD of which matches that of gain fiber 10. In fiber amplifier systems wherein the MFD of the gain fiber is sufficiently small to achieve suitable power density, the ratio of the MFD of fiber 13 to the MFD of fiber 21 is typically at least 1.5:1.

The relatively large difference between the MFD's and cutoff wavelengths of coupler fibers 21 and 13 result in a relatively large difference between the propagation constants ($\Delta\beta$) of the fundamental modes propagating in those fibers outside the coupling region. It is noted that a relatively large difference between the cutoff wavelengths of coupler fibers 21 and 13 can also result in a relatively large $\Delta\beta$. The effect of an MFD or cuoff wavelength difference on the propagation constants of the fundamental modes propagating in those fibers inside the coupling region ($\Delta\beta_{CR}$) is not as great. The cores of the coupler fibers can become so small in the coupling region that their effect on propagation becomes very small. When the fiber cladding diameter becomes sufficiently small, the composite of the core and cladding functions as the light guiding portion of the waveguide in the coupling region, and the surrounding low index matrix material functions as the cladding. Power therefore transfers between the adjacent fiber claddings in the coupling region. By controlling the length of the coupling region and the steepness of the transition region between the stretched and unstretched regions of the coupler fibers, if the $\Delta\beta_{CR}$ is small enough, the spectral coupling characteristics of the coupler can be made to be such that a high percentage of the signal light propagating in the large MFD fiber is coupled to the low MFD fiber and a low percentage of the pump source light propagating in the small MFD fiber is coupled to the large MFD fiber.

A similar effect occurs in fused biconically tapered couplers wherein the fibers are surrounded by air rather than matrix glass in the coupling region.

In the system of FIG. 1, there is some maximum acceptable value of $\Delta\beta_{CR}$ associated with the coupler fiber mismatch that is sufficiently small that coupling is not seriously degraded. A 1540 nm input signal coupled by such a coupler would be greater than some given minimum acceptable value, for example 95%.

Figure 3:
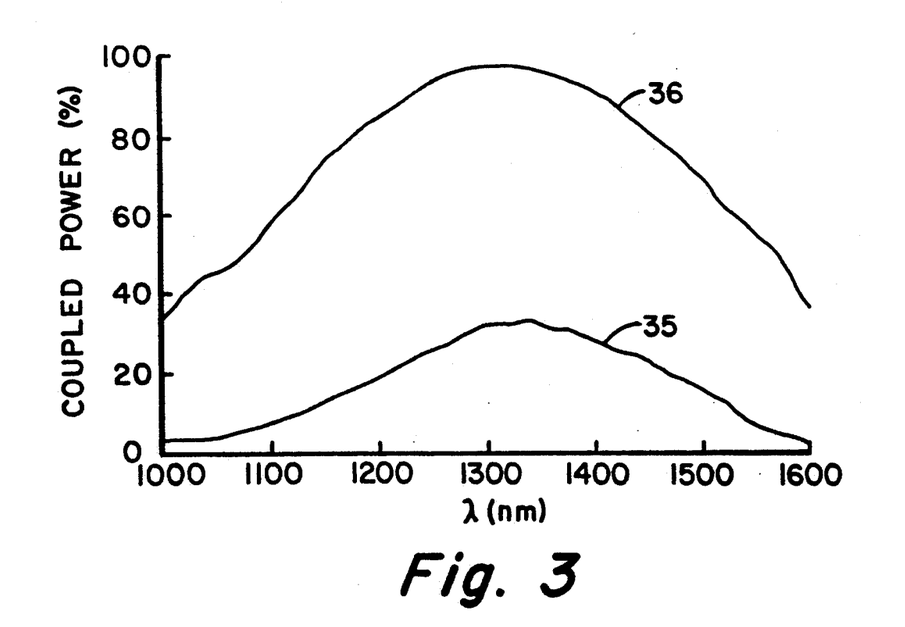
FIG. 3 is a graph comparing coupled power v. wavelength for a prior art coupler and a coupler formed in accordance with the invention.

However, in order to enhance gain fiber quantum efficiency, gain fibers having a $\Delta_{1-2}$ of at least 2.0% may be required. Assume that the coupler, referred to herein as Coupler A, utilized with that gain fiber comprised the above-identified commercially available telecommunication fiber and a small MFD fiber having a 2.0% $\Delta_{1-2}$ and a cutoff wavelength of approximately 1300 nm. Only 30 to 40% of the 1540 nm input power would couple from the input telecommunication fiber to the small MFD fiber at maximum coupling (see curve 35 of FIG. 3).

It is noted that coupler fiber $\Delta\beta_{CR}$ can be caused by differences in fiber characteristics other than $\Delta_{1-2}$, cutoff wavelength and core diameter. A $\Delta\beta_{CR}$ sufficiently large to degrade coupling can also occur if (a) the outside diameters of the coupler fibers differ, or (b) the coupler fibers are sufficiently different in composition or geometry that they are deformed differently upon collapse of the tubing during the manufacture of an overclad coupler.

It has been known that varying the refractive index of the fiber cladding in a fused biconically-tapered WDM coupler enhances the wavelength selectivity of the coupler. Also, the coupling from one fiber to the other in a 1×2 or 2×2 fused coupler increases with wavelength because diffractive mode field expansion increases with wavelength. The rate of change of this coupling with respect to wavelength limits how narrow a wavelength separation can be obtained between maximum and minimum coupling. By adjusting the indices of refraction, the $\beta$ curves of the fundamental modes of the two fibers in the coupling region can be made to cross at a high angle at some particular wavelength. Because complete coupling can only be obtained when $\Delta\beta_{CR} << C$, this causes coupling at a wavelength remote from the $\beta$ "crossover wavelength" to be reduced, thereby sharpening the wavelength dependence of the coupling. The coupling constant C is discussed later (see equation 2). This principle is taught in U.S. Pat. No. 5,129,020 (M. Shigematsu et al.) and in the publication: O. Parriaux et al., J. Optical Commun. 2 (1981) 3, pp. 105-109.

In U.S. Pat. No. 5,011,251 (Miller et al.) the use of cladding index modifiers is discussed in the context of achromatic couplers. The principle taught there is that a $\Delta\beta_{CR}$ between otherwise identical fibers can be created by such a means, and that this can be used to improve the achromaticity (wavelength flatness) of such a coupler. The $\Delta\beta_{CR}$ discussed in that patent may be wavelength dependent, but no crossing (where $\Delta\beta_{CR}\rightarrow 0$) is discussed.

SUMMARY OF THE INVENTION

An object of the invention is to provide a fiber optic coupler that couples an adequate percentage of the input power at a given wavelength despite a relatively large difference between the MFD's of the two coupler fibers. A further object is to provide a fiber optic coupler for use in a fiber amplifier having a gain fiber MFD much smaller than the MFD of the transmission telecommunication fiber to which the gain fiber is coupled. Yet another object is to provide means for modifying a fiber in a 1×2 or 2×2 fiber optic coupler to compensate for a mismatch in $\beta_{CR}$ which would result in less than a given percentage of power coupled from one fiber to the other.

Briefly, the fiber optic coupler of this invention comprises a first single-mode optical fiber having a biconical taper section and a second single-mode optical fiber having a biconical taper section, each of the fibers having a core surrounded by a cladding of refractive index $n_2$. The taper sections are fused together to form a coupling region. The coupling region is surrounded by a medium having a refractive index $m_3$ that is lower than $n_2$. The first fiber has first means for modifying the propagation constant of the fundamental mode in the coupling region to such an extent that the difference between the propagation constants of the first and second coupler fibers in the coupling region would, in the absence of the following second propagation constant modifying means, differ by such an amount that less than a given percent of light power of a wavelength $\lambda_s$ would normally couple from the second fiber to the first fiber. The coupler includes second means for modifying the propagation constant of one of the fibers by such an extent that more than the given percentage of the light power of wavelength $\lambda_s$ couples from the second fiber to the first fiber. The spectral propagation constant curves of those portions of the fibers that are in the coupling region are substantially parallel over the wavelength region of use. Indeed, it is possible for the spectral propagation constant curves of those portions of the fibers that are in the coupling region to be non-crossing in the wavelength region where maximum coupling occurs.

The second means for modifying the propagation constant of one of the fibers may simply be a modification of the refractive index of the cladding of one of the fibers. However, this use of index modifications to fiber cladding indices occurs in a different context than it does in U.S. Pat. Nos 5,011,251 and 5,129,020 and the Parriaux et al. publication. The coupler of this invention is fabricated of two differing fibers which must experience good coupling (coupling greater than some specified percentage). Such good coupling cannot be obtained unless the $\Delta\beta_{CR}$ is reduced by changing a property of one of the fibers, such as its index of refraction. In general, without the modification to one of the fibers, no $\beta$ crossing occurs. With the modification, a $\beta$ crossing may or may not occur. However, the distinction between the present coupler and those of U.S. Pat. No. 5,129,020 and the Parriaux et al. publication is that, even if a crossing does occur, the $\beta$ curves of the present coupler are substantially parallel, and no significant changes in the coupling properties due to variations of $\Delta\beta_{CR}$ with wavelength occur over the wavelength range of use for the coupler.

DESCRIPTION OF THE PREFERRED EMBODIMENTS

Figure 2:
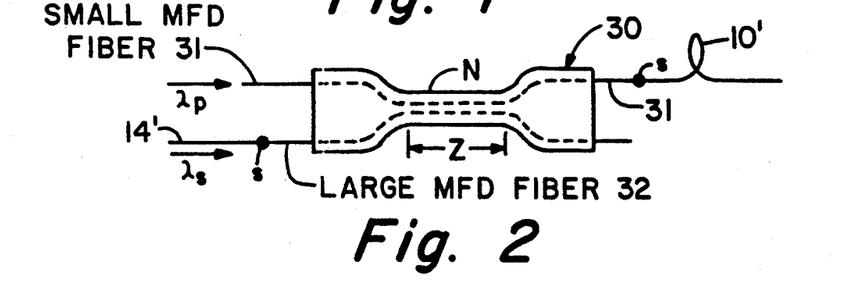
FIG. 2 is a schematic illustration of a fiber amplifier in accordance with the invention.

In the embodiment described herein, fiber optic coupler 30 of FIG. 2 is adapted for use in a fiber amplifier. Coupler 30 couples pump power of wavelength $\lambda_P$ from the input end of coupler fiber 31 and signal power of wavelength $\lambda_S$ from input telecommunication fiber 14' to gain fiber 10'. The fiber pigtails extending from coupler 30 are connected to other optical fibers by splices s.

In order to enhance gain fiber quantum efficiency, a gain fiber having a high $\Delta_{1-2}$ value and a small core diameter should be employed. It is also desirable that the cutoff wavelength of the small mode field diameter fiber be below wavelength $\lambda_P$ of the pump source in order to achieve optimal pump signal energy coupling and low noise. To obtain low coupler fiber/gain fiber splice loss, the coupler associated with that gain fiber should comprise a telecommunication type fiber having a large MFD matching that of the incoming telecommunication fiber and a small MFD fiber having a MFD that substantially matches the gain fiber MFD. If the gain fiber $\Delta_{1-2}$ value is sufficiently high, its core diameter is sufficiently small, and/or its cutoff wavelength is sufficiently different from the telecommunication type fiber, the resultant coupler fiber $\Delta\beta_{CR}$ will adversely affect the coupling of the signal power from the input transmission fiber to the gain fiber.

To overcome the coupler $\Delta\beta_{CR}$ and increase the coupled signal power to an acceptable level, i.e. over 95%, a fiber characteristic, whose affect on MFD is insignificant, is modified in one of the coupler fibers. This can be done, for example, by changing the refractive index of the cladding of one of the coupler fibers. A technique for accomplishing this is disclosed in U.S. Pat. No. 5,011,251. The cladding glass of one coupler fiber can be doped with a sufficient amount of chlorine relative to the cladding glass of the other coupler fiber whereby the $\Delta\beta_{CR}$ that would have otherwise existed between those fibers is minimized or substantially cancelled. Other cladding dopants might be used as well. For instance, small concentrations of $B_2O_3$ and fluorine could be used to lower the index of a fiber cladding, whereas dopants such as $GeO_2$ can be used to increase the cladding index. Other known techniques can be employed for compensating coupler fiber $\Delta\beta_{CR}$, for example, the outside diameter of one of the fibers could be etched.

A theoretical analysis was made of 1×2 or 2×2 2-fiber achromatic 3 dB couplers using coupled mode theory to model their behavior. The analysis was based on the principles taught in the publication, A. W. Snyder and J. D. Love, *Optical Waveguide Theory*, Chapman and Hall, New York, 1983. In accordance with this theory, the mode field of the 2×2 overclad coupler of FIG. 2 is assumed to be a linear combination of the fundamental modes $\psi_1$ and $\psi_2$ of each of the fibers 32 and 31 in the absence of the other fiber, i.e. with the fiber surrounded by only overclad index material of refractive index $n_3$. The propagation constants and mode fields can be determined exactly for such a structure (see M. J. Adams, *An Introduction to Optical Waveguides*).

The coupling constant which describes the optical coupling between the two cores can then be written as an overlap integral:

$$C = \int \psi_1(r)\psi_2(r')(n-n')dA \qquad (2)$$

In this equation, $\psi_1$ and $\psi_2$ are the mode fields of the two cores, r and r' are the radial distances from the center of the cores of fibers 32 and 31, respectively, n is the index structure of the entire coupler, n' is the index structure with the core and cladding of fiber 32 replaced by overcladding material of index $n_3$, and the integral is over the entire cross-section of the coupler (but $n-n'$ is only non-zero over the core and cladding of fiber 32). The mode fields are assumed to be normalized in this equation, i.e. the integrals $\int \psi_1^2 dA$ and $\int \psi_2^2 dA$ both equal 1.

While these are tapered devices, their qualitative behavior is adequately modeled by assuming a constant draw ratio over a given coupling length, with no coupling outside this length, i.e. assuming that the diameter of neckdown region N of FIG. 2 is constant over the entire length z of the neckdown region. This approximation works well since the coupling constant is a rapidly increasing function of draw ratio, and thus the behavior of a coupler is dominated by the behavior at the highest draw ratio. Using this approximation, with the power launched into the core of fiber 32, then, as a function of z, the length along the coupler axis, the power in the two cores is given by $$P_1(z) = 1 - F^2 \sin^2\left(\frac{C}{F} z\right) \qquad (3)$$

and $$P_2(z) = F^2 \sin^2\left(\frac{C}{F} z\right) \qquad (4)$$

where the factor F is given by $$F = \left[1 + \left(\frac{\beta_1 - \beta_2}{2C}\right)^2\right]^{-\frac{1}{2}} \qquad (5)$$

where $\beta_1$ and $\beta_2$ are the propagation constants of fibers 32 and 31, respectively.

Results can be made more quantitative by integrating the coupling equations along the taper. Still more accurate simulations may be done using beam propagation techniques (Fourier transform, finite difference, etc.), although at the cost of much increased computational time.

From Equations 4 and 5 it is seen that the maximum coupling to fiber 32 is given by the factor $F^2$. The term "substantially parallel propagation constant curves" is defined herein to mean that, over a given operational wavelength window, the factor $F^2$ does not drop below the given level of minimum acceptable coupling. Thus, in couplers of the present invention (which may or may not have a wavelength at which $\Delta\beta_{CR}=0$) the wavelength-dependence properties of the coupler are determined by the wavelength dependence of the coupling constant C, and are not substantially altered by changes in the value of $\Delta\beta_{CR}$.

Figure 4:
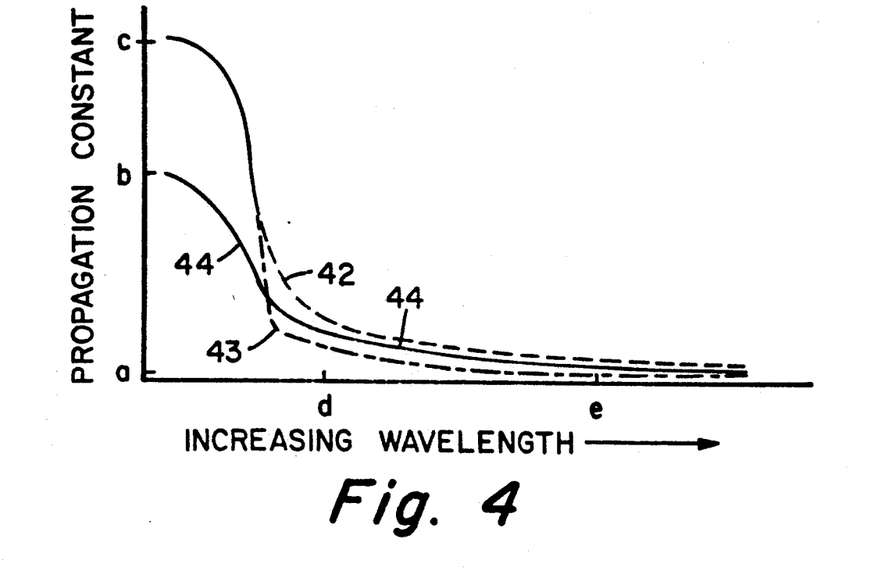
FIG. 4 illustrates the manner in which the propagation constants of the fundamental modes in the coupling region vary with respect to wavelength over a wide wavelength range that extends beyond the wavelength range of use where maximum coupling occurs.
Figure 5:
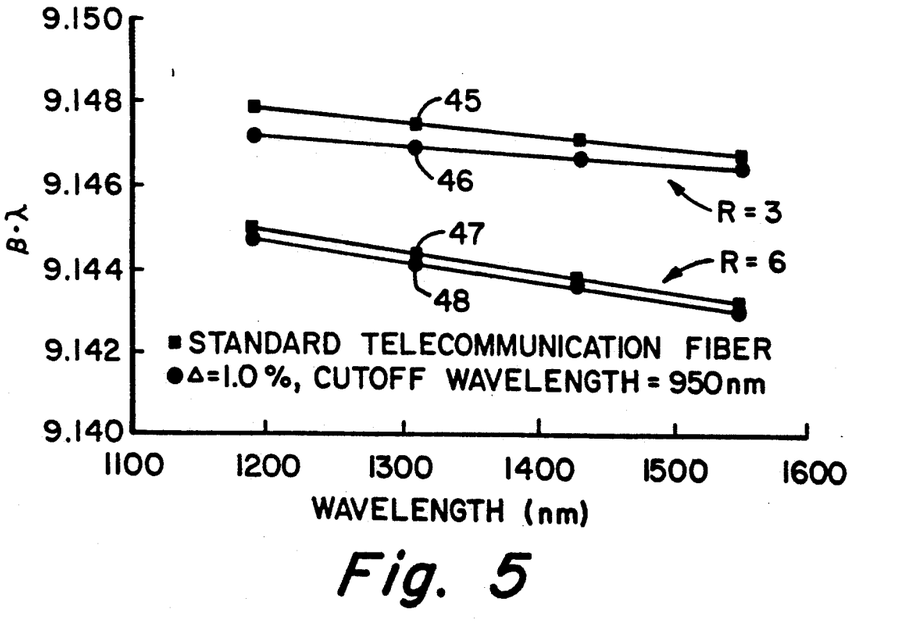
FIG. 5 illustrates the spectral variation in $\beta\lambda$ for couplers formed of non-identical fibers having mode field diameters that are sufficiently mismatched that less than 80% of the optical power can be coupled at a predetermined wavelength.

The present invention can be employed to improve coupling when the propagation constant curves of the two coupler fibers are as illustrated in FIGS. 4 and 5. FIG. 4 illustrates the manner in which the propagation constants of the fundamental modes in the coupling region vary with respect to wavelength. Curve 44 represents the propagation constant for the coupler fiber having a low value of $\Delta_{1\text{-}2}$, and its maximum value b is equal to the refractive index of the low $\Delta_{1\text{-}2}$ core times $2\pi/\lambda$. Curves 42 and 43 represent the propagation constants for coupler fibers having a relatively high value of $\Delta_{1\text{-}2}$ and a cladding index equal to that for the fiber represented by curve 44, and their maximum value c is equal to the refractive index of the high $\Delta_{1\text{-}2}$ core times $2\pi/\lambda$. Therefore, curves 42, 43 and 44 all asymptotically decrease to a value a that is equal to the refractive index of the medium surrounding the fibers times $2\pi/\lambda$; the value a is the same for all of the fibers. If the high $\Delta_{1\text{-}2}$ fiber has a cutoff wavelength less than that of the low $\Delta_{1\text{-}2}$ fiber, the propagation constant of the high $\Delta_{1\text{-}2}$ fiber will follow curve 43, whereby it crosses curve 44 at a wavelength far below the minimum use wavelength d of the coupler. If the high $\Delta_{1\text{-}2}$ fiber has a cutoff wavelength greater than or about equal to that of the low $\Delta_{1\text{-}2}$ fiber, the propagation constant of the high $\Delta_{1\text{-}2}$ fiber will follow a curve such as curve 42, whereby it will not cross curve 44 at a wavelength far below the minimum use wavelength d of the coupler. If the propagation constant curves of the two fibers cross in the use range of wavelengths, then no propagation constant modification is necessary to obtain coupling at a minimum acceptable level, and the principles of this invention need not be applied. In the practical embodiments that are presently envisioned, the fiber $\Delta_{1\text{-}2}$ and cutoff wavelength are sufficiently different that a means of modifying $\{\beta_{CR}$ is required for acceptable performance. In all cases, the $\beta$ curves are substantially parallel to one another. In one of the embodiments contemplated by this invention, the propagation constant curves do not cross in the wavelength region of maximum coupling.

In FIG. 5 $\beta_{CR}\lambda$ is plotted as a function of wavelength for each of the two coupler fibers. The plots are of $\beta_{CR}\lambda$ rather than just $\beta_{CR}$ since $\beta_{CR}$ is proportional to $1/\lambda$ in all cases. This type of plot scales out the predominant variation, whereby small differences in $\beta_{CR}$ can be ascertained. FIG. 5 represents couplers formed of a commercially available telecommunication fiber of the type described above and a small MFD fiber ($\Delta = 1.0\%$, cutoff wavelength approximately 950 nm) with no modifications to either fiber to improve coupling. Draw ratios R are indicated as being 3 and 6. The draw ratio is the ratio of the diameter of the tube from which the overclad coupler is made to the diameter of the tube in the neckdown region after the stretching step. Curves 45 and 47 are the $\beta_{CR}\lambda$ curves for the large MFD coupler fibers, and curves 46 and 48 are the $\beta_{CR}\lambda$ curves for the small MFD coupler fibers. The curves are substantially parallel and are non-crossing. In accordance with this invention, the propagation constant curve of either fiber is modified, for instance by doping the small core diameter fiber with an index-raising dopant such as chlorine, to move the curves closer together and allow more complete coupling to occur.

Since the $\beta\lambda$ curves are substantially parallel, the coupler preform can be drawn to couple at any wavelength within the wavelength region of interest by simply selecting the proper length. This cannot be done when the $\beta_{CR}\lambda$ curves cross steeply at a given wavelength, since the coupler preform must then be drawn to a length that causes coupling to occur at that given wavelength.

In order to illustrate the improvement provided by the present invention, overclad couplers A and B were compared. Coupler A (described above) had no $\beta$-modifying feature to improve signal power coupling, and coupler B had such a feature. The coupler stretch step was performed such that maximum coupling occured at about 1310 nm. Since no fiber characteristics were modified to compensate for the $\Delta\beta_{CR}$, the spectral coupling was as shown curve 35 of FIG. 3, coupled power being about 32% at 1310 nm.

Coupler B also included the above-identified standard telecommunication fiber and a small MFD fiber having a 2.0% $\Delta_{1\text{-}2}$ and a cutoff wavelength of about 1260 nm. However, Coupler B differed from Coupler A in that the cladding of the large MFD fiber of Coupler B contained about 0.15 wt. % more chlorine in its cladding than the large MFD fiber of Coupler A whose cladding contained only about 0.04–0.06 wt % chlorine, the amount normally retained in the cladding glass after the drying/consolidation step of the fiber preform. The coupler stretch step was again performed such that maximum coupling occured at about 1310 nm. The spectral coupling of the second coupler is illustrated by curve 36 of FIG. 3, coupled power being greater than 97% at 1310 nm.

The coupler of this invention is also useful in devices other than the forward-pumped fiber amplifier of FIG. 2. It is useful, for example, in the various other types of devices described in EP-A-0504479 such as counter-pumped and dual-ended fiber amplifiers and devices for coupling light from a laser diode into a telecommunication fiber.

Figure 6:
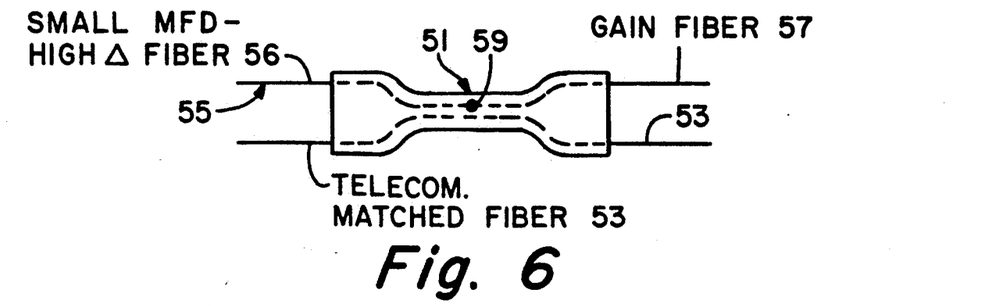
FIG. 6 is a cross-sectional view of a further coupler embodiment.

As disclosed in EP-A-0504479, it is undesirable for pump power to be applied to a portion of the gain fiber in which the optical signal is not propagating. Therefore, at least that portion of the low MFD fiber that extends between the coupler and the pump source cannot contain lasing dopant. In its simplest form, the entire small MFD coupler fiber is free from lasing dopant, as described above. However, the splice loss between the coupler and the gain fiber can be essentially eliminated by employing coupler 51 of FIG. 6. Coupler 51 includes a fiber 53, the MFD of which substantially matches that of telecommunication fibers of the type to which it is adapted to be spliced. Coupler fiber 55 is formed of two optical fiber sections 56 and 57 which are spliced within the necked down portion of the coupler at interface 59. Fiber section 57 is the gain fiber, the core of which contains a lasing dopant. As in the previous embodiments, the MFD of fiber section 56 can substantially match that of fiber section 57. Alternatively, the MFD of fiber section 56 can be different from fiber section 57, its MFD being such that it efficiently receives power from another fiber or a laser diode source of pumping light. In either case, the effect of any mode field mismatch between fiber sections 56 and 57 is minimized since that splice is located at a point where the $\Delta_{1\text{-}2}$ and core diameter of the fiber have little effect, i.e. in the necked-down region of the coupler.

Figure 7:
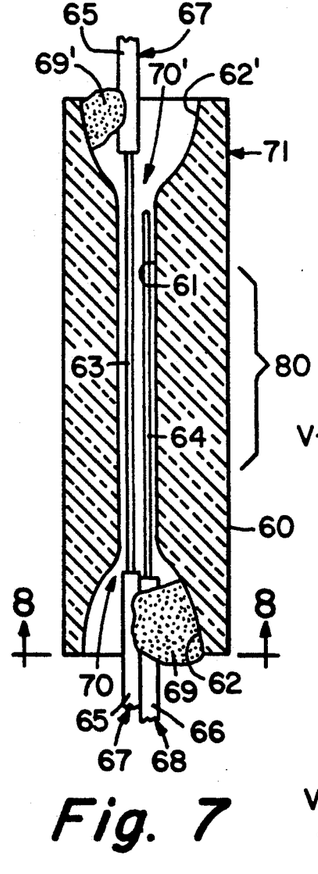
FIG. 7 is a cross-sectional view of a coupler preform.
Figure 8:
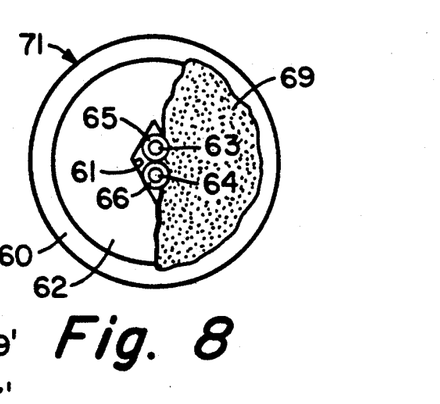
FIG. 8 is a cross-sectional view taken along lines 8—8 of FIG. 7.

The coupler of the present invention can be formed in accordance with the teachings of the aforementioned U.S. Pat. No. 5,011,251. FIGS. 7 and 8 show a glass tube 60, the axial bore 61 of which has funnels 62 and 62' at its ends. The cross-sectional shape of the bore can be circular, diamond-shaped, square, or the like. The softening point temperature of tube 60 should be lower than that of the fibers that are to be inserted therein. Suitable tube compositions are $SiO_2$ doped with 1 to 25 wt. % $B_2O_3$ and $SiO_2$ doped with 0.1 to approximately 2.5 wt. % fluorine. In addition to lowering the softening point temperature of $SiO_2$, $B_2O_3$ and F also decrease its refractive index. The tube can be made softer by employing additional $B_2O_3$ and using a dopant such as $GeO_2$ to increase the refractive index to the desired level. It is sometimes desirable to employ a tube having a gradient refractive index. For example, the inner region of the tube can have a first refractive index, and the outer region of the tube can have a refractive index lower than the first refractive index.

Coated optical fibers 67 and 68 consist of optical fibers 63 and 64 and their protective coatings 65 and 66, respectively. Fiber 67 is sufficiently long that a usable length thereof extends beyond each end of tube 60. Fiber 68 is sufficiently long that a usable length thereof extends beyond only one end of tube 60. Each of fibers 63 and 64 includes a core and cladding, the radii and refractive indices of the cores being such that the MFD of fiber 64 is larger than that of fiber 63. A portion of the coating intermediate the ends of coated fiber 67 is removed for a distance slightly shorter than the length of bore 61. A portion of the coating is removed from the end of coated fiber 68. Coated fiber 67 is threaded through the bore until the uncoated portion is disposed intermediate the ends of the tube. Optical fiber 64 is threaded into the bore until its uncoated portion is disposed within funnel 62. A small amount 69 of glue is applied to one side of the coated fibers to attach them to one side of funnel 62 while leaving an opening 70 which permits access to bore 61. Coated fiber 67 can be subjected to a slight tension and then a drop of glue is similarly applied between coated fiber 67 and funnel 62'.

Figure 9:
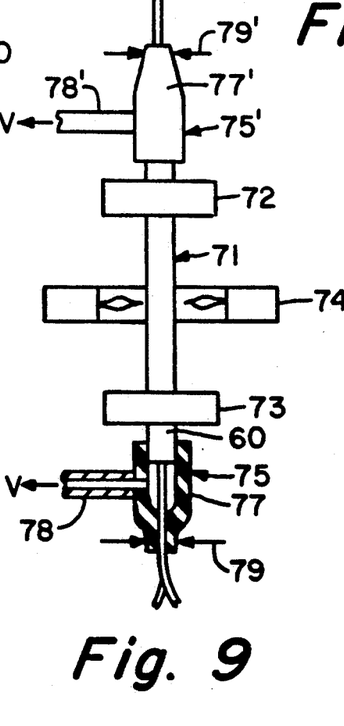
FIG. 9 is a schematic illustration of an apparatus for collapsing the coupler preform and drawing the midregion thereof.

An apparatus for performing the tube collapsing and stretching steps is shown in FIG. 9. Chucks 72 and 73, which are used to secure the coupler preform in this apparatus, are mounted on motor controlled stages which are preferably controlled by a computer. Ring burner 74 is capable of evenly heating the capillary tube midregion.

Coupler preform 71 of FIGS. 7 and 8 is inserted through ring burner 74 and is clamped to the draw chucks. The fibers are threaded through vacuum attachments 75 and 75' which are then affixed to the ends of tube 60. Vacuum attachment 75, which is shown in cross-section in FIG. 9, includes a tube 77, that is attached to the end of tube 60, and a vacuum line 78. The end of tube 77 can be clamped to the fibers as indicated by arrows 79. Upper vacuum attachment 75' includes similar elements, which are represented by primed reference numerals.

A vacuum V is applied to both ends of preform 71. The coupler preform is heated by burner 74 for a short period of time, typically between about 12 and 25 seconds, to increase the temperature of the midregion of the tube to the softening temperature. With the assistance of the differential pressure on the tube, the tube midregion 80 collapses onto the fibers. The tube matrix glass surrounds the fibers and fills the aperture to form a solid structure.

The central portion of the collapsed midregion of the tube can be stretched without removing the device from the apparatus in which the tube was collapsed. After the tube cools, the flame is reignited, and the center of the collapsed region is reheated. The flame duration for the stretch process, which depends upon the desired coupler characteristics, is usually between 10 and 20 seconds. The shorter heating period for the stretch step results in a stretched region that is shorter than the collapsed region. After the collapsed tube is reheated, chucks 72 and 73 pull in opposite directions until the coupler length has been increased by a predetermined amount.

Optical power can be coupled to an input optical fiber, and the output signals can be monitored to control process steps in the coupler manufacturing process. See, for example, U.S. Pat. No. 5,011,251. In the specific example described below, output power was not monitored during stretching. In previous experience with overclad fiber optic couplers, the total stretching distance for both stages was usually between 12 and 16 mm. The couplers described in this example were therefore initially elongated by some distance within that range. The optical characteristics of the resultant device were measured, and the stretching or elongation distance of the subsequently made coupler was adjusted in such a manner as to more nearly achieve the desired characteristics. By this process, the optimal stretching distance was achieved. Thereafter, all couplers of that type were stretched the optimal distance in order to achieve the desired optical characteristics. However, process parameters such as the elongation distance can be fine tuned as a result of optical characterization of the produced couplers.

After the coupler has cooled, the vacuum lines are removed from the coupler and a drop of glue is applied to each end of the capillary tube where it flows at least partially into the longitudinal aperture. This produces a hermetic seal and also increases the pull strength of the device.

The following specific example describes a method of making a fiber amplifier and a fiber optic coupler for use in the amplifier.

The coupler fibers and the gain fiber were made by the process disclosed in U.S. Pat. No. 4,486,212 (which is incorporated herein by reference) or by a similar process. Briefly, in accordance with that patent, a porous core preform comprising a core region and a thin layer of cladding glass is formed on a cylindrical mandrel. The mandrel is removed, and the resultant tubular preform is gradually inserted into a consolidation furnace muffle, the maximum temperature of which is between 1200° and 1700° C. and preferably about 1490° C. for high silica content glass. The temperature profile of the muffle is highest in the central region as taught in U.S. Pat. No. 4,165,223, which is incorporated herein by reference. Chlorine, which is normally present in the minimum concentration that is required to achieve drying, may be supplied to the preform by flowing into the preform aperture a drying gas consisting of helium and chlorine. The end of the aperture is plugged to cause the gas to flow through the preform pores. A helium flushing gas is simultaneously flowed through the muffle.

The resultant tubular glass article is stretched in a standard draw furnace while a vacuum is applied to the aperture to form a "core rod" in which the aperture has been closed. A suitable length of the rod is supported in a lathe where particles of silica are deposited thereon. The resultant final porous preform is gradually inserted into the consolidation furnace where it is consolidated while a mixture of helium and chlorine is flowed upwardly therethrough. The resultant glass preform is drawn to form a step-index, single-mode optical fiber.

(a) FORMING TELECOMMUNICATIONS TYPE FIBER 64

A first layer of glass particles comprising $SiO_2$ doped with 8.5 wt. % $GeO_2$ was deposited on a mandrel, and a thin layer of $SiO_2$ particles was deposited on the first layer. The mandrel was removed, and the resultant porous preform was gradually inserted into a furnace having an alumina muffle where it was dried and consolidated. During this process, a gas mixture containing 65 sccm (standard cubic centimeter per minute) chlorine and 650 sccm helium flowed into the center hole where the mandrel had been removed. A flushing gas containing 40 slpm (standard liters per minute) helium and 0.5 slpm oxygen flowed upwardly from the bottom of the muffle. The aperture was evacuated, and the lower end of the tubular body was heated to 1900° C. and drawn at a rate of about 15 cm/min to form a 5 mm solid glass rod. The rod was severed to form sections, one of which was supported in a lathe where it functioned as a mandrel upon which $SiO_2$ cladding soot was deposited to form a final porous preform. The final porous preform was gradually inserted into the alumina muffle of a furnace having a maximum temperature of 1490° C. where it was consolidated to form a draw blank. During the consolidation process, a gas mixture containing 40 slpm helium, 0.6 to 0.7 slpm chlorine and 0.5 lpm oxygen flowed through the muffle. This treatment resulted in a residual chlorine concentration of about 0.15 to 0.20 wt. % in the cladding. The tip of the draw blank was heated to about 2100° C., and a fiber having an outside diameter of 125 μm was drawn therefrom, the fiber being coated with a 170 μm diameter urethane acrylate coating during drawing.

(b) FORMING THE SMALL MFD COUPLER FIBER 63

Except for the following differences, a process similar to that described in section (a) was employed to form fiber 63. A first layer of glass particles comprising $SiO_2$ doped with 18 wt. % $GeO_2$ was deposited on a mandrel, and a thin layer of $SiO_2$ particles was deposited on the first layer. The resultant porous core preform was consolidated, stretched and overcoated with pure silica cladding. The ratio of the core diameter to the outside diameter of the resultant draw blank was such that the core was smaller than that of fiber 64 (see Table 1). During the consolidation of the pure silica overcoat, a gas mixture containing 40 slpm helium, 0.5 slpm chlorine and 0.5 slpm oxygen flowed through the muffle. This treatment resulted in a residual chlorine concentration of about 0.05 wt. % in the cladding. The fiber was drawn to an outside diameter of 125 μm and was provided with 170 μm diameter urethane acrylate coating.

c. FIBER CHARACTERISTICS

Table 1 lists $\Delta^{esi}$ (equivalent step index delta), $d^{esi}_c$ (equivalent step index core diameter), and the MFD of these fibers. The mode field parameters for fiber 64 are those nominal values that were previously measured for production fibers; they were determined using the variable aperture far-field method in accordance with the Petermann II definition of mode field diameter. The mode field parameters for fiber 63 are calculated.

TABLE 1

|  | $\Delta^{esi}$ | $d^{esi}_c$ | Mode Field Diameter at 1550 nm | at 1000 nm |
|---|---|---|---|---|
| Fiber 64 | 0.0036 | 8.3 μm | 10.5 μm | 5.7 μm |
| Fiber 63 | 0.0191 | 3.4 μm | 4.4 μm | 2.8 μm |

The calculated splice loss between fiber 64 and a fiber having a 2% $\Delta_{1-2}$ and a cutoff wavelength of 950 nm is 3.75 dB at 980 nm and 1.80 dB at 1540 nm.

d. FORMING THE COUPLER

Glass capillary tube 60 had a 3.8 cm length and an outside diameter of 2.8 mm. The bore was diamond shaped, each side of the diamond having a length of about 310 μm. The capillary tube, which was formed by a flame hydrolysis process, was comprised of silica doped with 8.0 wt. % $B_2O_3$. Each funnel 62 was formed by flowing $NF_3$ through the tube while heating the end of the tube.

Coated optical fibers 67 and 68 were cut to lengths of about 3.0 meters and 1.5 meters, respectively. A section of coating about 2.8 cm long was removed from the central region of fiber 67. A 6 cm long section of coating was removed from the end of coated fiber 68. An antireflection termination was formed on the end of fiber 64 by directing a flame at the center of the stripped region while the end of the fiber was pulled and severed to form a tapered end. The tip of fiber 64 was heated by a burner flame to cause the glass to recede and form a rounded endface, the diameter of which was equal to or slightly smaller than the original uncoated fiber diameter. The resultant stripped end region was about 3.2 cm long.

Coated fiber 67 was threaded through the bore until the uncoated portion was disposed intermediate the ends of the tube. Optical fiber 64 was threaded into the bore until its coated portion was disposed within funnel 62. A small amount 69 of UV-curable adhesive was applied to the coated fibers to tack them to funnel 62 as shown in FIGS. 7 and 8. Coated fiber 67 was subjected to a slight tension, and a small amount 69' of UV-curable adhesive was applied to the coated fiber 67 to tack it to funnels 62'.

Coupler preform 71 was inserted through ring burner 74 and clamped to draw chucks 72 and 73 of the apparatus of FIG. 10. Vacuum attachments 75 and 76 were secured to the ends of the tube and were clamped (arrows 79) to apply to preform 71 a vacuum that was allowed to stabilize at approximately 46 cm (18 inches) of Hg.

Gas and oxygen were flowed to the ring burner at 0.60 slpm and 1.2 slpm, respectively. The ring burner was turned on for about 18 seconds to increase the temperature of the midregion of the tube to its softening temperature. This caused tube to collapse onto the fibers along a section of the tube about 0.5 cm long. After the coupler preform cooled for about 30 seconds, the flame was reignited with the gas and oxygen flows being the same as for the tube collapse step, and the collapsed region was reheated for about 17 seconds. The vacuum remained at approximately 46 cm of Hg. Chucks 72 and 73 moved in opposite directions at a rate of about 2.0 cm/sec to provide a total increase in coupler length of about 1.62 cm.

After the coupler had cooled, the vacuum lines were removed from the coupler, and a drop of adhesive was applied to each end of the capillary tube and was exposed to UV light for 60 seconds. The coupler was then removed from the draw.

Low insertion loss couplers have been produced by the above-described process. When a 1310 nm input signal was propagated into input fiber 14', one such coupler had an insertion loss of 0.26 dB, an excess loss of 0.13 dB, and a coupling ratio of 97.06%. The coupling curve 36 for that coupler appears in FIG. 3.

I claim:

1. A fiber optic coupler comprising a first single-mode optical fiber having a biconical taper section and a second single-mode optical fiber having a biconical taper section, each of said fibers having a core surrounded by a cladding of refractive index $n_2$, said taper sections being fused together to form a coupling region, said coupling region being surrounded by a medium having a refractive index $n_3$ that is lower than $n_2$, said first fiber having first means for modifying the propagation constant of the fundamental mode in the coupling region to such an extent that the difference between the propagation constants of said first and second fibers in said coupling region would, in the absence of the following second propagation constant modifying means, differ by such an amount that less than a given percent of light power of a wavelength $\lambda_S$ would normally couple from said second fiber to said first fiber, and second means for modifying the propagation constant of one of said fibers by such an extent that more than said given percentage of the light power of wavelength $\lambda_S$ couples from said second fiber to said first fiber, the spectral propagation constant curves of those portions of said fibers that are in said coupling region being substantially parallel to each other in the wavelength region where maximum coupling occurs.

2. A coupler in accordance with claim 1 wherein said medium comprises an elongated body of matrix glass having two end regions and a midregion, said first and second optical fibers extending longitudinally within said body and being fused together along with the midregion of said body, the diameter of the central portion of said midregion being smaller than the diameters of said end regions, said central portion of said body midregion constituting said coupling region.

3. A coupler in accordance with claim 1 wherein said second means for modifying comprises means for modifying the refractive index of the cladding of one of said fibers.

4. A coupler in accordance with claim 1 wherein said second means for modifying comprises an amount of chlorine in the cladding of said second fiber that is greater than the amount of chlorine in the cladding of said first fiber, whereby the refractive index of the cladding of said second fiber is greater than that of the cladding of said first fiber.

5. A coupler in accordance with claim 1 wherein said given percentage is 95%.

6. A coupler in accordance with claim 1 wherein said first fiber comprises a single fiber having a substantially uniform mode field diameter throughout its length.

7. A coupler in accordance with claim 1 wherein said first coupler fiber comprises two fiber segments that are fused together within said coupling region, said segments having different mode field diameters.

8. A coupler in accordance with claim 7 wherein that fiber segment having the lower mode field diameter comprises a gain fiber having a core that is doped with lasing material.

9. A coupler in accordance with claim 1 wherein the mode field diameter of at least a portion of said first fiber is smaller than that of said second fiber.

10. A coupler in accordance with claim i wherein the mode field diameter of said first fiber is smaller than that of said second fiber.

11. A coupler in accordance with claim 1 wherein the spectral propagation constant curves of those portions of said fibers that are in said coupling region are non-crossing in the wavelength region where maximum coupling occurs.

12. A fiber amplifier comprising gain fiber means for amplifying optical signals, and a fiber optic coupler comprising a first single-mode optical fiber having a biconical taper section and a second single-mode optical fiber having a biconical taper section, each of said fibers having a core surrounded by a cladding of refractive index $n_2$, said taper sections being fused together to form a coupling region, said coupling region being surrounded by a medium having a refractive index $n_3$ that is lower than $n_2$, an end of said first fiber being connected to said gain fiber means, said first fiber having first means for modifying the propagation constant of the fundamental mode in the coupling region to such an extent that the difference between the propagation constants of said first and second fibers in said coupling region would, in the absence of the following second propagation constant modifying means, differ by such an amount that less than a given percent of light power of a wavelength $\lambda_S$ would normally couple from said second fiber to said first fiber, and second means for modifying the propagation constant of one of said fibers by such an extent that more than said given percentage of the light power of wavelength $\lambda_S$ couples from said second fiber to said first fiber, the spectral propagation constant curves of those portions of said fibers that are in said coupling region being substantially parallel to each other in the wavelength region where maximum coupling occurs.

13. A fiber amplifier in accordance with claim 12 wherein said medium comprises an elongated body of matrix glass having two end regions and a midregion, said first and second optical fibers extending longitudinally within said body and being fused together along with the midregion of said body, the diameter of the central portion of said midregion being smaller than the diameters of said end regions, said central portion of said body midregion constituting said coupling region.

14. A fiber amplifier in accordance with claim 12 wherein said second means for modifying comprises means for modifying the refractive index of the cladding of one of said fibers.

15. A fiber amplifier in accordance with claim 12 wherein said second means for modifying comprises an amount of chlorine in the cladding of said second fiber that is greater than the amount of chlorine in the cladding of said first fiber, whereby the refractive index of the cladding of said second fiber is greater than that of the cladding of said first fiber.

16. A fiber amplifier comprising gain fiber means for amplifying optical signals, and fiber optic coupler means having first and second coupler optical fibers, one end of said first coupler fiber being connected to said gain fiber means, the mode field diameter of said first coupler fiber being substantially matched to that of said gain fiber means and being smaller than that of said second coupler fiber, a portion of said coupler fibers being situated in a wavelength dependent light transfer relationship whereby most of the light power of a wavelength $\lambda_S$ couples between said first and second coupler fibers, and most of the light power of a wavelength $\lambda_P$ that is introduced into said first fiber remains in said first coupler fiber, the mode field diameter difference between said fibers causing the propagation constants of said first and second coupler fibers in said coupling region to differ by such an amount that less than a given percent of light power of a wavelength $\lambda_S$ would normally couple from said second fiber to said first fiber, and means for modifying the propagation constant of one of said fibers by such an extent that more than said given percentage of the light power of wavelength $\lambda_S$ couples from said second fiber to said first fiber, the spectral propagation constant curves of those portions of said fibers that are in said coupling region being substantially parallel to each other.

17. A fiber amplifier in accordance with claim 16 wherein each of said coupler fibers has a biconical taper section, and each of said fibers has a core surrounded by a cladding of refractive index $n_2$, said taper sections being fused together to form a coupling region, said coupling region being surrounded by a medium having a refractive index $n_3$ that is lower than $n_2$.

18. A fiber amplifier in accordance with claim 17 wherein said medium comprises an elongated body of matrix glass having two end regions and a midregion, said first and second optical fibers extending longitudinally within said body and being fused together along with the midregion of said body, the diameter of the central portion of said midregion being smaller than the diameters of said end regions, said central portion of said body midregion constituting said coupling region.

19. A fiber amplifier in accordance with claim 18 wherein said one end of said first coupler fiber is fusion spliced to said gain fiber means.

20. A fiber amplifier in accordance with claim 18 wherein the connection between said first coupler fiber and said gain fiber is located within said coupling region.

* * * * *